Jan. 17, 1939.  A. FEINBERG  2,143,979
AIR CONDITIONING APPARATUS
Filed July 9, 1936   2 Sheets—Sheet 1
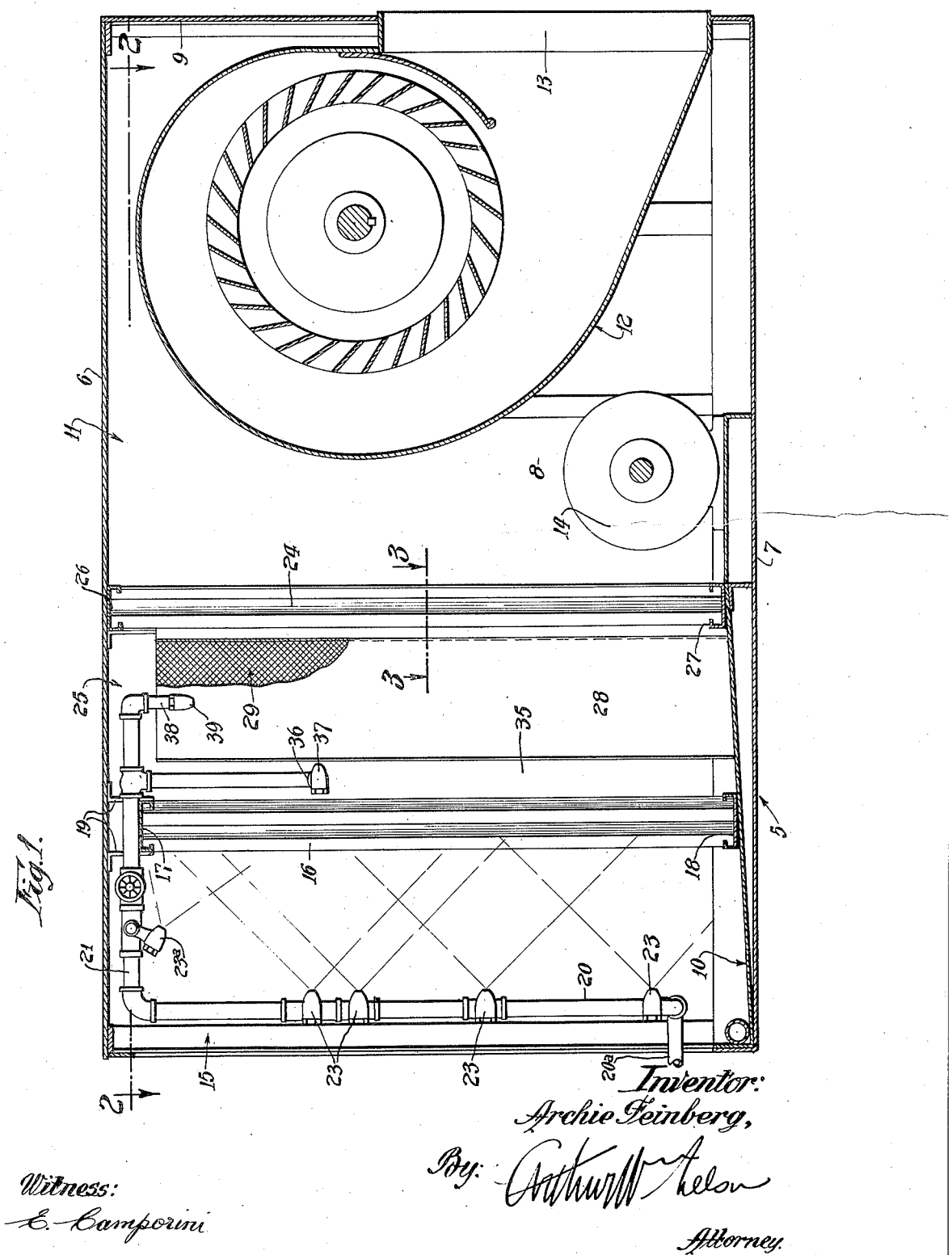

Jan. 17, 1939.   A. FEINBERG   2,143,979
AIR CONDITIONING APPARATUS
Filed July 9, 1936   2 Sheets-Sheet 2
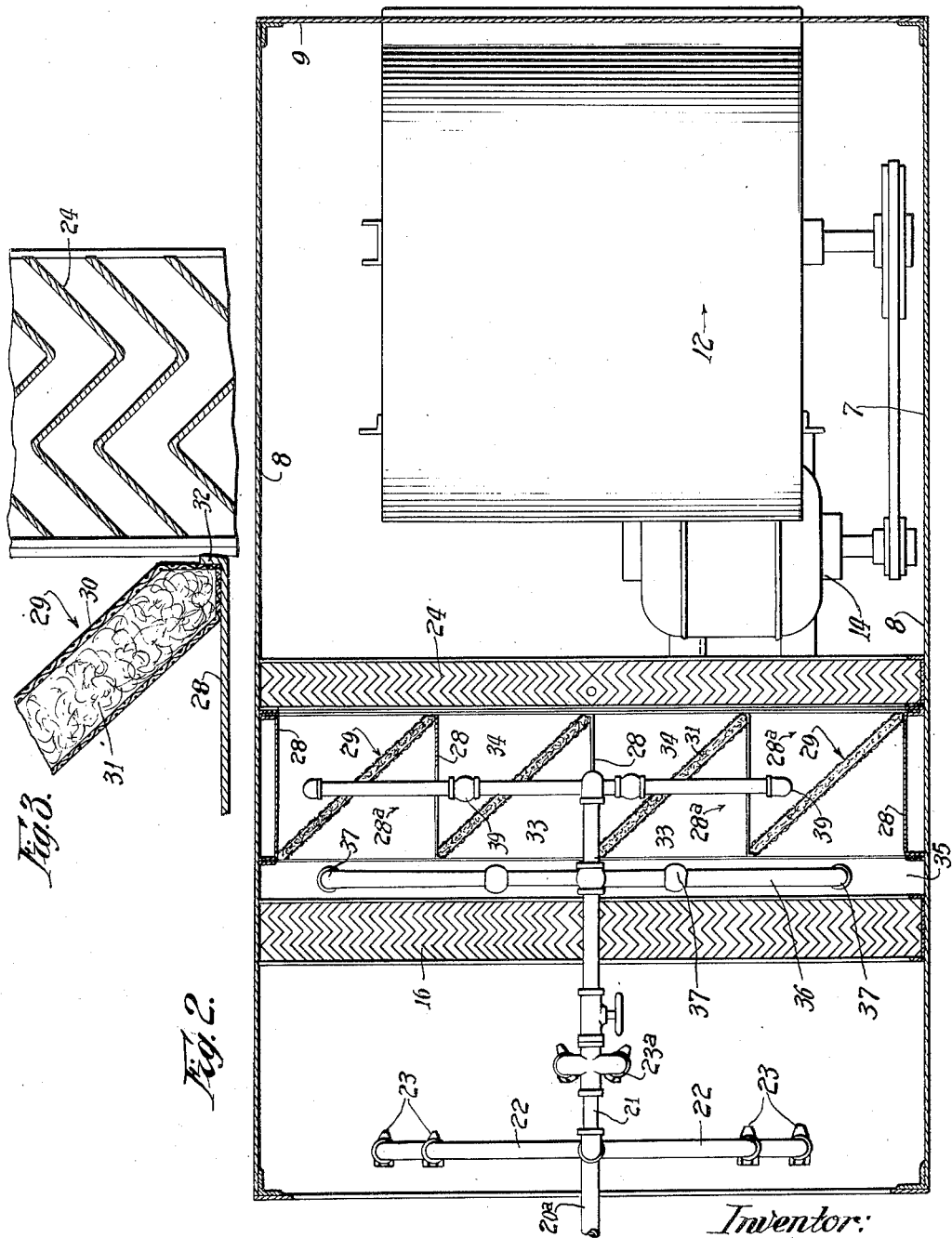
Inventor:
Archie Feinberg,
By: 
Attorney.
Witness:
E. Camporini Patented Jan. 17, 1939

2,143,979

UNITED STATES PATENT OFFICE 2,143,979

AIR CONDITIONING APPARATUS

Archie Feinberg, Chicago, Ill., assignor to United States Air Conditioning Corporation, Minneapolis, Minn., a corporation of Minnesota Application July 9, 1936, Serial No. 89,792

5 Claims. (Cl. 183—8)

This invention relates to improvements in air conditioning apparatus and it consists of the matters hereinafter described and more particularly pointed out in the appended claims.

The apparatus with which the present invention is concerned is of the kind which cleans and cools the delivered blast of air by means of water vaporization. Apparatus now conventional for such purpose occupies much space, involves a considerable initial cost as well as a relatively high cost of operation due to the amount of water and power required. This makes such apparatus impractical for the ordinary small store or restaurant. The conventional apparatus above mentioned requires the atomization of between 4 and 5 gallons of water per minute for each 1000 cubic feet of air per minute passing through the same, where cooling of 60 to 65% of the wet bulb depression is desired. By the term "wet bulb depression" is meant the difference in degree between dry and wet bulb thermometers.

The use of such a large quantity of water makes impractical the use of water direct from city taps for several reasons.

A conventional apparatus to cool an ordinary small store or restaurant should deliver about 7000 cubic feet of air per minute to provide a rapid enough air change to evacuate built up heat in the said store or restaurant. This would require the use of between 28 to 35 gallons of water per minute or about 18000 gallons for a 10-hour day, the cost of which is prohibitive.

In order to secure the 60 to 65% wet bulb depression cooling effect, besides the atomization of 4 to 5 gallons of water per minute for each 1000 cubic feet of air handled, it is necessary to pass the air through the apparatus at a slow velocity, say about 400 lineal feet per minute. This requires a passage area of approximately 18 square feet and under this must be provided a tank to receive and from which to provide the amount of water being handled as by a recirculating pump. It is apparent that such apparatus is so bulky that installation can only be made on a roof or in a basement and from either of these locations, ducts are required to conduct the cooled air to the discharge deflectors in said store or restaurant. Such apparatus is therefore impractical for use in the small store or restaurant because of the cost involved and the amount of space required.

One of the objects of the present invention is to provide an air conditioning apparatus including air scrubbing elements in the form of filter mats of a novel structure and arrangement whereby water is so efficiently used and minimized as to require no recirculation thereof, thereby making it practical and convenient to use direct tap water and at the same time permit a higher speed of air blast or circulation therethrough, all of which enables a reduction in height and width dimensions and also reduces initial and operating costs.

A further object of the invention is to provide an apparatus of this kind which includes a novel air conditioning chamber therein divided into compartments each containing a filter mat extending diagonally of the corners of said compartments to further divide each compartment into front and rear triangular spaces wherein the air is treated to sprays and mists before and after passing through said mats for a better vaporization and sensible heat cooling of the same.

Another object of the invention is to provide an apparatus of this kind which is practical for use in small stores and the like because of the low initial and operating costs, and because it requires no expensive installation and duct work but may occupy out-of-the-way spaces such as above doorway vestibules or may be suspended from the ceiling or at any other place at which fresh outside air is available.

The above mentioned objects of the invention, as well as others, together with the several advantages thereof will more fully appear as the specification proceeds.

In the drawings:

Fig. 1 is a longitudinal vertical sectional view through an air conditioning apparatus embodying the preferred form of the invention;

Fig. 2 is a longitudinal horizontal sectional view through the apparatus as taken on the line 2—2 of Fig. 1; and Fig. 3 is a detail horizontal sectional view through a part of the apparatus on an enlarged scale as taken on the line 3—3 of Fig. 1.

Referring now in detail to that embodiment of the invention, illustrated in the accompanying drawings: 5 indicates as a whole the rectangular casing of the apparatus which is open at its rear or air inlet end and which comprises top and bottom walls 6 and 7, side walls 8—8 and a front wall 9. In the rear end half of the casing is a rearwardly and downwardly inclined wall 10 which constitutes the bottom for the air washing, cleaning and cooling compartments of the casing.

In the front and air discharge end of the casing is a blower compartment 11 in which is located a blower 12 having a discharge mouth 13 that opens through the bottom portion of the front wall 9. This blower which has side inlets is belt-driven from a motor 14 located toward the rear end of the bottom of the compartment 11.

In the rear end of the casing is provided an initial air cleaning and cooling compartment 15 defined at the front by a set of vertical eliminator plates 16. These plates which are sharply corrugated, horizontally considered, engage at their top and bottom ends in suitable, oppositely facing channels 17 and 18 respectively. The top channel 17 is supported from the top wall 6 of the casing by depending brackets 19 while the bottom channel rests upon the inclined wall 10. The eliminator plates of the set of plates 16 are so spaced laterally as to provide tortuous or zig-zag passages between adjacent plates as best appears in Fig. 2.

In the median line of the casing, toward the rear end of the compartment 15 is a riser pipe 20 having a bottom inlet 20a. Connected to the top end of this pipe is a horizontally disposed, forwardly extending feed pipe 21 the purpose of which will later appear. Operatively connected to the riser pipe is a plurality of laterally extending horizontal headers 22, carrying spray nozzles 23. The pipe 21, carries a plurality of spray nozzles 23a which coact with the nozzles 23 in providing a spray coverage area approximating the area of the set of eliminator plates 16.

24 indicates a second set of eliminator plates spaced a suitable distance forwardly of the set 16. The set of eliminator plates 24, defines the rear end of the blower chamber and coacts with the first mentioned set of eliminator plates in forming an air cleaning or scrubbing mat and spray chamber 25. The eliminator plates 24 which are also sharply corrugated, horizontally considered, engage at their top and bottom ends in suitable oppositely facing channels 26 and 27 respectively. The top channel 26 is secured to the top wall 6 of the casing while the bottom channel rests upon the higher front end of the inclined bottom wall 10.

In the chamber 25 and nearer the eliminator plates 24 than the eliminator plates 16 is located a plurality of laterally spaced upright partitions 28 dividing this part of the chamber into a plurality of adjacent compartments 28a as best appears in Fig. 2. These partitions engage at their bottom ends upon the inclined bottom wall 10 while the top ends of said partitions terminate in a plane below that of the feed pipe 21.

Extending diagonally across opposite corners of each compartment is an air scrubbing element or filter mat 29. Each element comprises a hollow foraminous body 30 preferably of a suitable wire mesh and a filler of fibrous-like material 31 such as spun glass. The end margins of the partitions 28 are formed to provide flange-like shoulders 32 (see Fig. 3) for engagement by the lateral edge portions of each element body 30. Preferably the edges have a double bevel as shown in Fig. 3 whereby a better engagement is provided therefor with the shoulders 32 without sacrificing the air scrubbing qualities of said elements at these points. These elements divide each compartment into substantially triangularly shaped inlet and outlet spaces 33—34 respectively as best appears in Fig. 2.

Operatively connected to the feed pipe 21 and depending therefrom into the space 35 between the eliminator plates 16 and compartments 28a is a pipe, the bottom end of which has a lateral header 36 carrying spray nozzles 37. These nozzles are arranged to spray, one into each inlet space 33 upon the face of the element 29 therein for supplying water thereto.

38 indicates a transversely extending pipe arranged above the top ends of the elements 29 at a point about midway between the front and rear ends of the partitions 28. Depending from the pipe 38 into the top end of the outlet space 34 of each compartment 28a is a short pipe extension each carrying a misting nozzle 39 at its bottom end for discharging a mist into each outlet space 34.

Assume that the blower 12 is in operation and that water is flowing up the riser pipe under city water main pressure. With the blower in operation, it is apparent that a blast of air passes through the casing from its open inlet end to its outlet end. With the nozzles 23 and 23a discharging a spray into the inlet end of the casing as a curtain, substantially commensurate in area with the cross sectional area of the casing, all air entering the inlet end must pass through the spray. This washes the air free of all dust particles and odors so that it is clean. While some cooling effect is present due to vaporization, this effect is only secondary. After the air has passed through the spray curtain, it enters the zig-zag spaces between the eliminator plates of the first set of plates 16, where a greater part of the moisture entrained in the air in its passage through the spray curtain, is eliminated. By reason of said zig-zag spaces, the air blast is caused to impinge upon the surfaces of the eliminator plates and much of the moisture condenses thereon to run down into the tank provided therefor and which has a suitable outlet for disposal.

After the air leaves the set of eliminator plates 16, it enters the inlet spaces 33 of the various compartments 28a to pass through the various scrubbing elements of filter mats which are thoroughly wetted by the sprays 37. It is apparent that these elements with their filters, such as spun glass, provide innumerable strands, each coated with a film of water due to adsorption. As the air passes through these elements, it is caused to travel a tortuous path and into contact with said strands with a scrubbing action so as to absorp vapor or moisture therefrom. In this passage of air through these elements, it is not only again cleaned but is reduced further in temperature by vaporization. As the air passes through the said elements, it enters the outlet spaces 34 thereof to pass through the mist produced therein by the nozzle 39, for further cleaning and cooling effect. It is apparent that the surfaces of each partition 28 will be quite wet with a water film thereon so that such air as impinges thereagainst receives a further washing and cooling.

After the air leaves said outlet spaces, it must pass through the spaces between the eliminator plates of the set 24, whereby the greater amount of moisture entrained in the air is removed before it enters the inlets for the blower for a discharge through the outlet.

By reason of the use of the elements 29, with their foraminous body and filler, the use of water is minimized to such an extent as to make a small size apparatus or unit practical. Also with these elements arranged in the fashion mentioned, element of larger surface area and capacity may be employed without increasing the longitudinal dimensions of the apparatus.

For instance, an apparatus made in accordance with the present invention and having dimensions about 65 inches long, 38 inches wide and 38 inches high is especially adapted for use in the smaller stores and restaurants because of the convenience with which it may be located over doorway vestibules or suspended from a ceiling. With such a small size unit including the adsorption surfaces of the element 29, one-half gallon of water per minute per 1000 cubic feet of air is practical to cool the air to 60 to 65% cooling of the wet bulb depression. Experience shows that such cooled air does not carry so much moisture as to make it incapable of further evaporating moisture from the body to produce the desired cooling effect.

With the apparatus described, the air is efficiently conditioned because it first receives a washing and pre-cooling, is further cleansed and cooled as it passes through the inlet spaces 33 and the elements 29 and is again cleansed and cooled as it passes through the outlet spaces 34. As the air passes through the set of eliminator plates 24, the moisture content is reduced to about 60 to 65% of wet bulb depression before it enters the blower for discharge.

By reason of the structure described, it is possible to provide a relatively small size air conditioning apparatus having a large capacity and which is economical in water and power used so as to make it practical for the purpose intended.

While in describing the invention, I have referred in detail to the form, arrangement and construction of the parts employed, the same is to be considered only in the illustrative sense so that I do not wish to be limited thereto except as may be specifically set forth in the appended claims.

I claim as my invention:

1. In an air conditioning apparatus, a casing having air inlet and outlet ends, a blower in the outlet end of said casing for producing an air blast therethrough, air washing means at the inlet end of the casing including spray producing means and moisture eliminating means, means including partitions providing a plurality of adjacent compartments arranged transversely of the casing between said air washing means and the blower, air scrubbing means extending between the partitions of each compartment at other than a right angle thereto and dividing each compartment into inlet and outlet spaces, means for supplying water to said air scrubbing means on the inlet space side thereof, and means between the air scrubbing means and the blower for removing entrained moisture from the air blast passing therethrough.

2. In an air conditioning apparatus, a casing having air inlet and outlet ends, a blower in the outlet end of said casing for producing an air blast therethrough, air washing means at the inlet end of the casing including spray producing means and moisture eliminating means, means including partitions providing a plurality of adjacent compartments arranged transversely of the casing between said air washing means and the blower, air scrubbing means in each compartment and extending across diagonally opposite corners thereof and dividing the same into triangular inlet and outlet spaces, each air scrubbing means comprising a hollow foraminous body and a filler of fibrous like material, means for supplying water to said scrubbing means from the air inlet space side thereof, and means between said air scrubbing means and the blower for removing entrained moisture from the air blast passing therethrough.

3. In an air conditioning apparatus, a casing having air inlet and outlet ends, a blower in the outlet end of said casing for producing an air blast therethrough, air washing means at the inlet end of the casing including spray producing means and moisture eliminating means, means including partitions providing a plurality of adjacent compartments arranged transversely of the casing between said air washing means and the blower, air scrubbing means in each compartment and extending across diagonally opposite corners thereof and dividing the same into triangular inlet and outlet spaces, each air scrubbing means comprising a hollow foraminous body and a filler of fibrous-like material, means for supplying water to said scrubbing means from the air inlet space side thereof, means producing a water mist in the outlet spaces of said compartments, and means between said outlet spaces of said compartments and said blower for removing entrained moisture from the air blast passing therethrough.

4. In an air conditioning apparatus, a casing having air inlet and outlet ends, a blower in the outlet end of said casing for producing an air blast therethrough, means providing a plurality of adjacent compartments arranged transversely of the casing between said inlet end and said blower and separated from each other by longitudinally extending partitions, a hollow foraminous body with a filler of fibrous material extending diagonally across each compartment and dividing the same into triangularly shaped inlet and outlet spaces, a riser pipe at the inlet end of the casing and including laterally extending spray headers, a pipe extending forwardly from the top end of said riser, spray nozzles connected to said pipe, one for the inlet space of each compartment for supplying water to each hollow body and its filler, moisture eliminator means between the riser pipe and said hollow bodies, and moisture eliminator means between said hollow bodies and the blower.

5. In an air conditioning apparatus, a casing having air inlet and outlet ends, a blower in the outlet end of said casing for producing an air blast therethrough, means providing a plurality of adjacent compartments arranged transversely of the casing between said inlet end and said blower and separated from each other by longitudinally extending partitions, a hollow foraminous body with a filler of fibrous material extending diagonally across each compartment and dividing the same into triangularly shaped inlet and outlet spaces, a riser pipe at the inlet end of the casing and including laterally extending spray headers, a pipe extending forwardly from the top end of said riser, spray nozzles connected to said pipe, one for the inlet space of each compartment for supplying water to each hollow body and its filler, misting nozzles also connected to said pipe, one to discharge into the outlet spaces of each compartment, moisture eliminator means between the riser pipe and said hollow bodies, and moisture eliminator means between said outlet spaces and the blower.

ARCHIE FEINBERG.